United States Patent [19]

Hall et al.

[11] Patent Number: 5,375,934
[45] Date of Patent: * Dec. 27, 1994

[54] REPLACEMENT BEARING FOR WORN SHAFTS

[75] Inventors: David A. Hall, Indianapolis; John R. Marjancik, Brownsburg, both of Ind.

[73] Assignee: Rexnord Corporation, Milwaukee, Wis.

[*] Notice: The portion of the term of this patent subsequent to Nov. 5, 2008 has been disclaimed.

[21] Appl. No.: 769,298

[22] Filed: Oct. 1, 1991

Related U.S. Application Data

[63] Continuation of Ser. No. 479,294, Feb. 13, 1990, Pat. No. 5,062,720.

[51] Int. Cl.⁵ ............................................. F16C 19/28
[52] U.S. Cl. ................................ 384/484; 384/490; 384/569
[58] Field of Search .............. 384/484, 489, 490, 537, 384/569

[56] References Cited

U.S. PATENT DOCUMENTS

| | | | |
|---|---|---|---|
| 1,161,465 | 11/1915 | Foley | 384/478 |
| 1,978,739 | 10/1934 | Brittain, Jr. | 384/478 |
| 1,991,077 | 2/1935 | Brittain, Jr. | 384/480 |
| 2,481,430 | 9/1949 | Koller | 384/379 |
| 2,688,520 | 9/1954 | Covington | 384/479 |
| 3,977,741 | 8/1976 | Lundberg . | |
| 4,690,574 | 9/1987 | Green | 384/569 |

FOREIGN PATENT DOCUMENTS 1203816  9/1970  United Kingdom .

Primary Examiner—Lenard A. Footland
Attorney, Agent, or Firm—Michael, Best & Friedrich

[57] ABSTRACT

A self lubricating replacement bearing assembly for supporting a rotating axle shaft within an axle housing containing axle lubricant. The rotating axle shaft includes an annular worn portion and an annular unworn portion. The bearing assembly is comprised of an annular sleeve member positioned in sealing engagement with the axle housing, and a plurality of bearing elements radially positioned on the inside annular surface of the annular sleeve member and positioned to engage the unworn portion or the axle shaft, and a single lip seal member fitted to the inner annular surface of the sleeve member and engageable with the rotating shaft to seal the rotating shaft within the axle housing and to retain the axle lubricant within the bearing assembly.

3 Claims, 4 Drawing Sheets

REPLACEMENT BEARING FOR WORN SHAFTS

This is a continuation of application Ser. No. 07/479,294 filed Feb. 13, 1990, now U.S. Pat. No. 5,062,720.

BACKGROUND OF THE INVENTION

The present invention relates to a novel bearing assembly for use as a replacement bearing for worn shafts and, particularly, worn axle shafts.

Bearing assemblies are utilized for supporting rotatable shafts within a shaft housing. Extended usage and rotation of the shaft within the shaft housing and bearing assembly oftentimes results in the shaft becoming worn where the shaft is contacted and maintained within the bearing assembly. Thus, the radial clearance between the shaft and the bearing assembly becomes excessive thereby resulting in the inoperability of the bearing axle assembly.

When the radial clearance between the worn axle shaft and bearing structure becomes excessive, the entire shaft and bearing assembly must be replaced with a new axle shaft and bearing assembly at substantial cost. Such replacement is expensive and time consuming and results in substantial down time of the vehicle in which the assembly is a component thereof.

It has also been suggested that the worn axle shaft may be rebuilt by depositing metal on the worn portion and then reworking and machining the axle shaft to the proper and correct dimension. However, the rebuilding and machining of worn shafts is expensive and time consuming and, therefore, provides an undesirable method or approach to replacing the shaft and bearing assembly.

It has also been suggested that a replacement bearing assembly may be provided which may be positioned about the unworn portion of a shaft. Such replacement bearing assemblies include bearing elements therein which are positioned on the shaft at a location adjacent the worn portion of the shaft. An example of such a replacement bearing assembly is disclosed in Green U.S. Pat. No. 4,690,574. Such bearing assemblies include sealing members at each end of the bearing assembly which confine the bearing elements therein and require that the bearing assemblies be packed with grease or lubricant when the bearing assembly is positioned about the worn shaft. Accordingly, such bearing assemblies have a lifetime limited to the extent that the confined grease or lubrication is retained within the bearing assembly. Also because such bearing assemblies include sealing members at each end of the bearing assembly which seal against the rotating shaft, increased wear occurs to the rotating shaft at the point when the sealing members engage the rotating shaft, thus resulting in increased wear to the shaft and bearing assembly.

SUMMARY OF THE INVENTION

It is one object of the present invention to provide a novel replacement bearing assembly or fitment to a worn axle shaft.

It is another object of the present invention to provide a novel replacement bearing assembly for fitment to worn axle shaft which includes a single sealing member.

it is still another object of the present invention to provide a replacement bearing assembly for fitment to a worn axle shaft which eliminates the need for grease or lubricant within the replacement bearing assembly.

It is yet another object of the present invention to provide a replacement bearing assembly for fitment to a worn axle shaft which is lubricated with the axle lubricant within the axle housing.

It is a further object of the present invention to provide a replacement bearing assembly for fitment to a worn axle shaft which substantially reduces the wear between the replacement bearing assembly and the axle shaft.

In one embodiment of the present invention, the replacement bearing assembly is adapted for fitment to a worn axle shaft rotatably mounted within an axle housing. The axle shaft includes an annular worn portion which is contacted with the rotatable bearing portion of the bearing assembly and an annular unworn portion adjacent to the annular worn portion.

The replacement bearing assembly of the present invention is comprised of an annular sleeve member adapted for fitment to the inner bore of the axle housing. The outer peripheral surface of the annular sleeve member is adapted for fitment to the bore of the axle housing and may, preferably, include an O-ring mounted within an annular groove on the outside surface of the sleeve member for sealing the annular sleeve member to the axle housing. Positioned and secured Within the sleeve member are rollers which act as bearing members or the bearing means of the assembly. The bearing members are positioned to engage the unworn portion of the rotating axle shaft adjacent to the worn portion of the shaft. The bearing members are retained within the annular sleeve by retaining rings which provide alignment of the rollers and permit the free rotation of the axle shaft within the bearing members.

The replacement bearing assembly further includes a sealing portion positioned axially of the bearing members. The sealing portion is comprised of a spring loaded lip seal mounted to a retaining housing that is press fit to engage the inner annular surface or bore of the annular sleeve member. The retaining housing and the lip seal are positioned to sealing engage the rotating axle shaft and to prevent lubricant from escaping from the axle housing.

By utilizing a single sealing portion or lip seal member in association with the replaceable bearing assembly, the necessity of using separate grease or lubricant within the bearing assembly is eliminated. Thus, the replaceable bearing assembly in accordance with the present invention permits the axle lubricant contained within the axle housing to lubricate the replaceable bearing assembly.

The present invention consists of certain novel features and a combination of parts hereinafter fully described, illustrated in the accompanying drawings, and particularly pointed out in the appended claims, it being understood that various exchanges in the details may be made without departing from the spirit or sacrificing any of the advantages of the present invention.

BRIEF DESCRIPTION OF THE DRAWINGS

For the purpose of facilitating an understanding of the present invention, there is illustrated in the accompanying drawings preferred embodiments thereof, from an inspection of which, when considered in connection with the following description, the invention, its construction and operation, axed many of its advantages wall be readily understood and appreciated.

DESCRIPTION OF THE PREFERRED EMBODIMENTS

Figure 1:
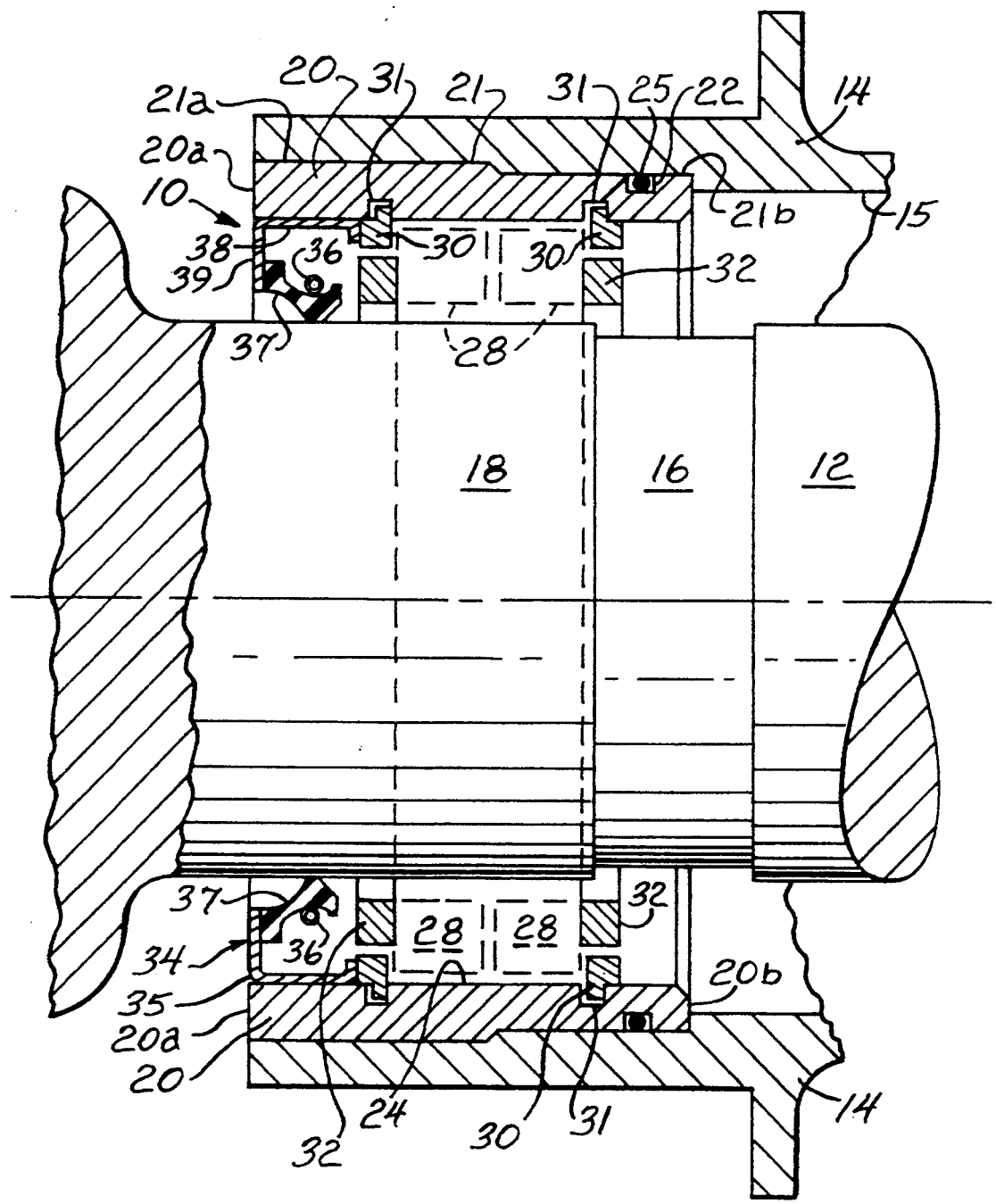
FIG. 1 is a cross-sectional view of a worn axle shaft assembly containing a replaceable bearing assembly constructed in accordance with one embodiment of the present invention.

Referring now to the drawings, wherein like numerals have been used throughout the several views to designate the same or similar parts, in FIG. 1 a replacement bearing assembly 10 is shown fitted about an axle shaft 12 mounted within an axle housing 14. The axle shaft 12 includes an annular worn portion 16 and an annular unworn portion 18 located adjacent to the worn portion. The replacement bearing assembly 10 is comprised of an annular sleeve member or means 20 which is adapted for fitment to the axle housing bore 15 of the axle housing 14. The outer peripheral surface 21 of the sleeve member 20 is sized and adapted for fitment to the axle housing bore 15 and generally includes an O-ring 25 mounted within an annular groove 22 on the outer annular surface 21 of the sleeve member 20. The O-ring provides a seal between the annular sleeve member and the axle housing 14, as will hereinafter be described.

Radially positioned about and secured within the annular sleeve member 20 are rollers or bearing elements 28 which provide and act as the bearing means or the bearing portion of the replacement bearing assembly 10. Bearing elements 28 are radially positioned about the inner annular surface 24 of the annular sleeve member 20 and are adapted to engage the unworn portion 18 of the axle shaft 12, when the replacement assembly 10 is positioned within the axle housing 14 and about the shaft 12, as shown in FIGS. 1-4. As shown in the drawings, bearing elements 28 are depicted as being tubular with pairs of the elements 28 being aligned in a predetermined location with respect to the annular sleeve. However, it is within the scope of the present invention that the roller elements 28 may be circular or that they may be single elongated tubes which rotatably secure the rotating shaft. The bearing elements 28 are retained within the inner annular surface 24 of the annular sleeve 20 by retainment rings 30 which are positioned within annular grooves 31 in the inner annular surface 24 of the sleeve member 20. The retainment rings 30 provide alignment of the rollers or bearing elements 28 and a raceway therefor and permit the free rotation of the axle shaft 12 within the bearing elements 28 of the bearing assembly 10. The rollers or bearing elements 28 are held in position by the retainment rings 30 and the rollers are spaced apart by either non-metallic or metallic retainer elements 32, as is known in the art.

The replacement bearing assembly 10 further includes a lip seal portion 34 mounted to a retaining housing 35 that is press fit to sealingly engage the inner annular surface 24 of the annular sleeve member 20 at the distal end 20a of the sleeve member. The retaining housing 35 includes an annular or tubular outer wall 38 having at least one annular flange 39 projecting radially inwardly from one end of the outer wall. The lip seal 37 is anchored to the flange 39 arid directed toward the bearing portion. The lip seal 37 is preferably spring loaded by spring 36 to cause the lip seal to sealingly engage the rotating axle shaft 12 to seal the bearing assembly 10 to the shaft and axle housing 14. The lip seal portion 34 provides a single sealing portion of the bearing assembly which permits the interior of the bearing assembly to be open towards the interior of the axle housing thereby permitting the axle housing lubricant to penetrate and lubricate the bearing assembly.

The outer annular surface 21 of the annular sleeve member 20 is generally comprised of a first outer annular surface 21a which is ground to size for press fitting to the axle housing bore 15. Generally, the outer annular surface 21 includes a second outer annular surface 21b which may be machined or ground to clear the existing axle housing bore or bearing seat 15.

Figure 2:
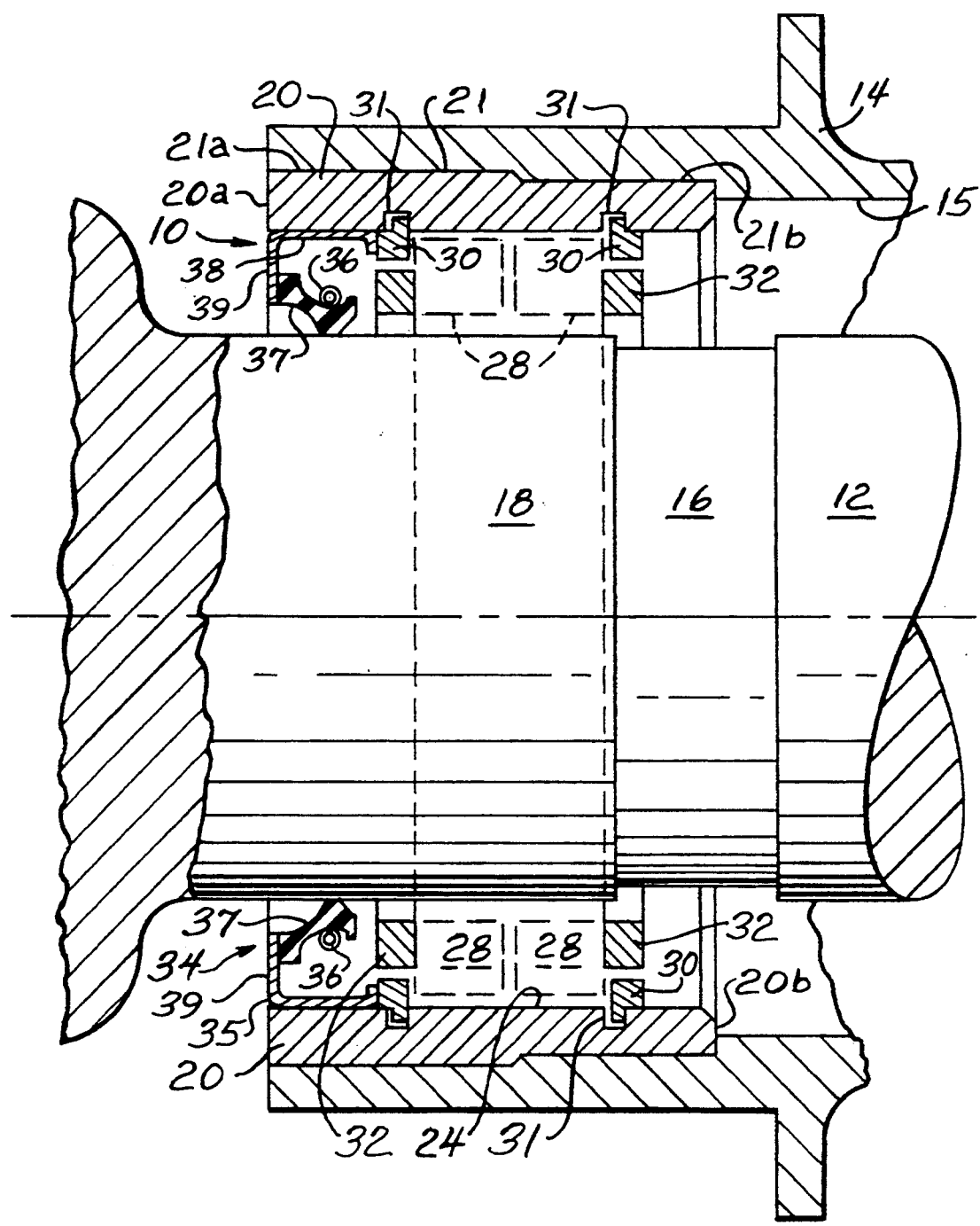
FIG. 2 is a cross-sectional view of a worn axle shaft assembly containing a replaceable bearing assembly in accordance with another embodiment of the present invention.

As shown in FIG. 2, the annular sleeve member 20 includes an outer annular surface 21a and an outer annular surface 21b which have been machined or ground to press fit to the axle housing bore 15. In the embodiment of the replacement bearing assembly shown in FIG, 2, a sealing compound has been applied to the outer annular surface 21 to provide that the annular sleeve member 20 is sealed to the axle housing bore 15 to prevent lubricant flow between the two surfaces. In such an embodiment, the annular sleeve member 20 does not include an outer annular groove 22 nor include an O-ring 25 between the annular sleeve member 20 and the axle housing 14 to provide a proper seal between the two members.

Figure 3:
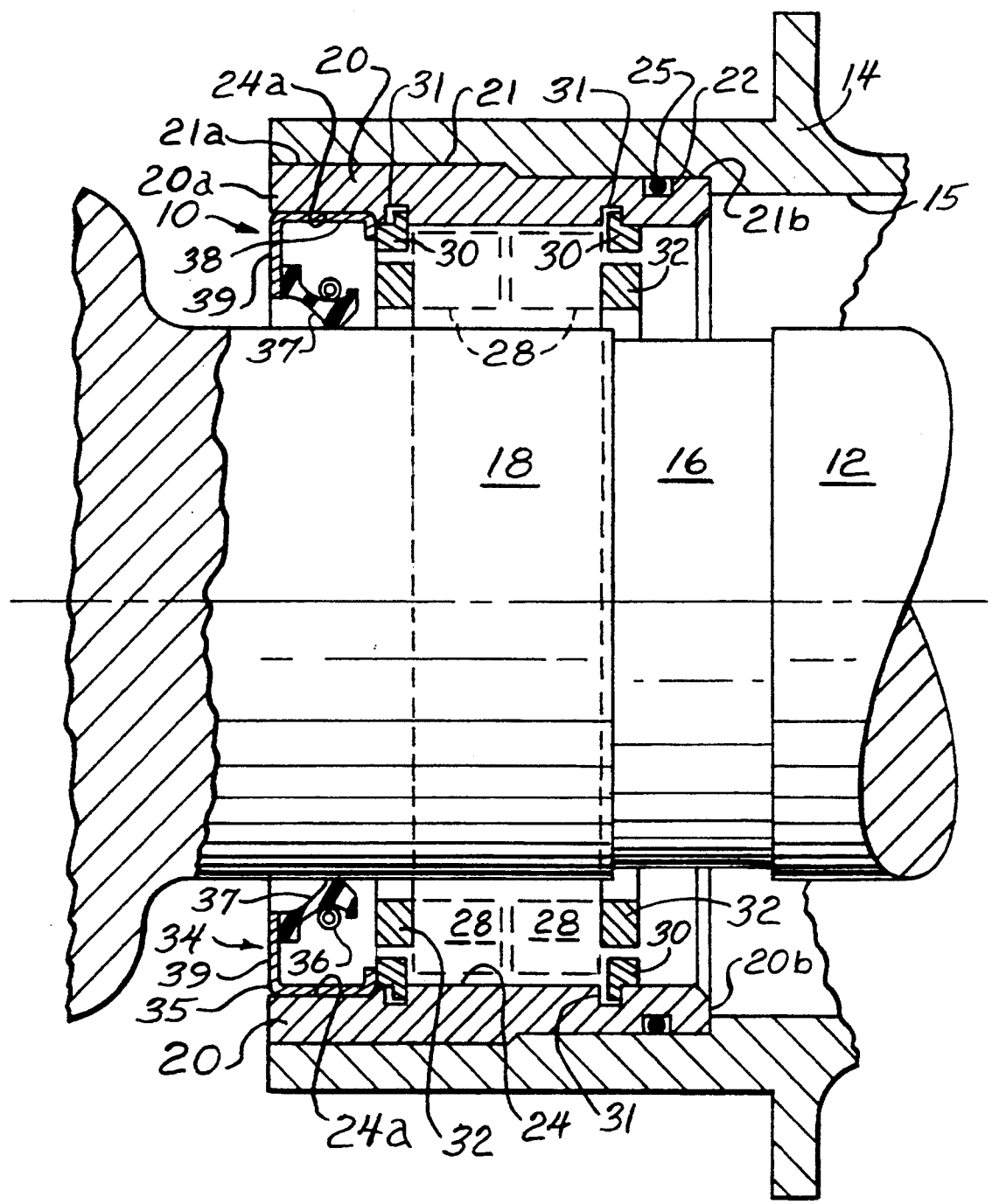
FIG. 3 is a cross-sectional view of a worn axle shaft assembly containing a replaceable bearing assembly in accordance with a further embodiment of the present invention.

FIG. 3 illustrates a further embodiment of the replacement bearing assembly 10 which is similar to the embodiment disclosed in FIG. 1. However, the inner annular surface 24 of the annular sleeve member 20 includes an annular groove 24a therein at or near the sleeve member's distal end 20a which is adapted to receive the retaining housing 35 of the lip seal portion 34. The retaining housing includes an annular or tubular outer wall 38 having at least one annular flange 39 projecting radially inwardly from one end of the outer wall. The lip seal 37 is anchored to the flange 39 and directed toward the bearing elements 28. The retaining housing 35 of the seal portion 34 is press fit into the annular groove 24a, preferably, with the annular flange 39 flush with the distal end 20a of the sleeve member 20 to sealingly engage the inner annular surface 24 of the annular sleeve member. The lip seal, again, is spring loaded by spring 36 to cause the lip seal to sealingly engage the rotating axle shaft 12 and to seal the resultant bearing assembly 10 to the shaft and axle housing.

Figure 4:
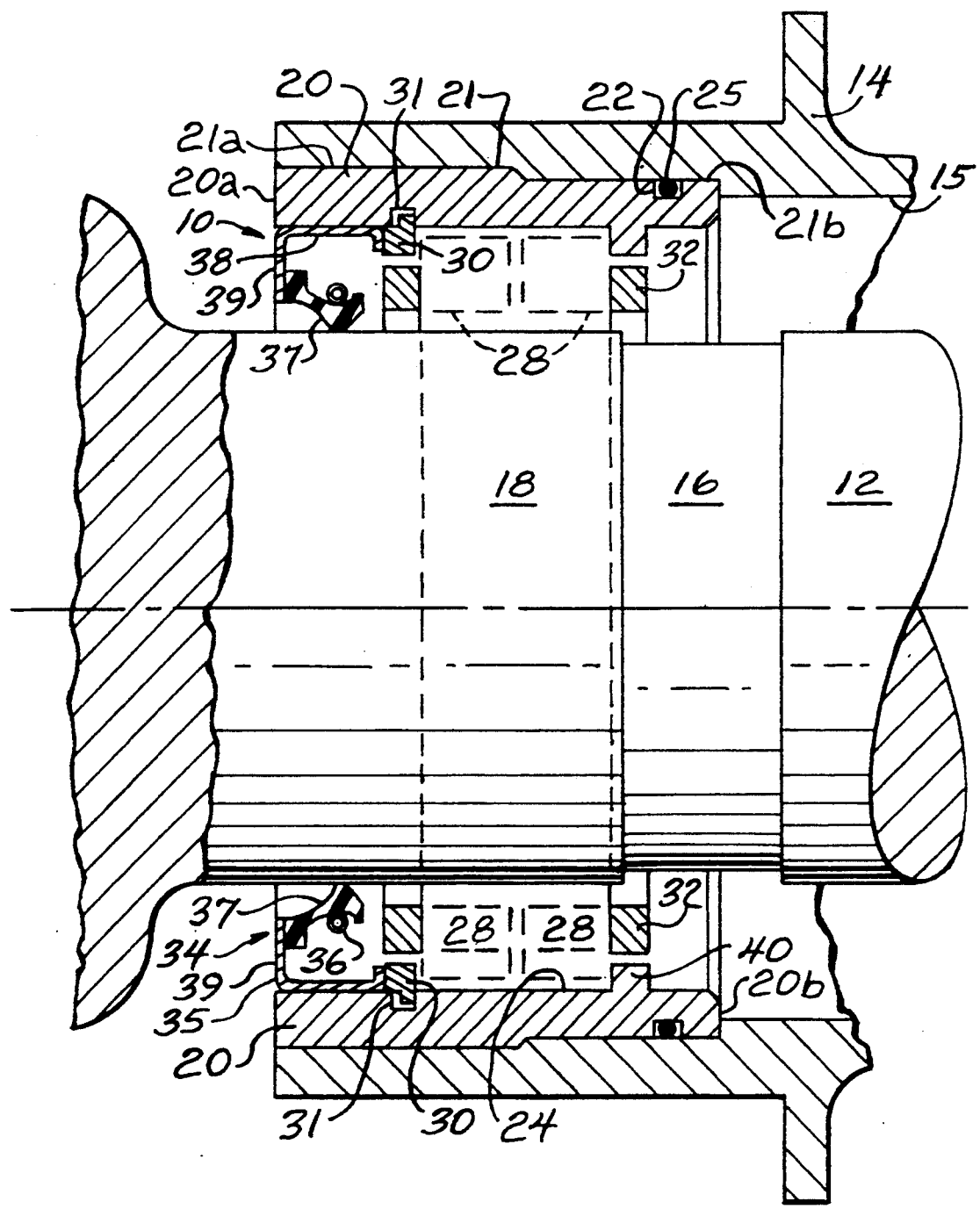
FIG. 4 is a cross-sectional view of worn axle shaft assembly containing a replaceable bearing assembly in accordance with still another embodiment of the present invention.

A further embodiment of the replacement bearing assembly 10 is illustrated in FIG. 4. Specifically, the bearing elements 28 are retained within the inner annular surface 24 of the annular sleeve 20 by utilization of at east one flange 40 that projects radially inwardly from the inner annular surface 24 of the annular sleeve 20 on at least one side of the bearing elements 28. As shown in FIG. 4, the annular flange 40 is positioned on the side of the bearing elements towards the proximal end 20b of the sleeve member 20. The annular flange 40 is, preferably, integral with the sleeve member 20. When the integral annular flange 40 is utilized on one side of the bearing elements 28, a retainer element 32 is utilized to position the rollers in spaced apart position within the bearing assembly 10. The replacement bearing assembly 10 in all other respects is similar to the bearing assembly 10 as shown in FIG. 1.

As is known in the art, axle lubricant is retained within the axle housing to lubricate the rotating shaft and prevent premature failure of the axle shaft and the bearing assembly. By the use of the novel replacement bearing assembly in accordance with the present invention, the necessity for the utilization of a separate grease or lubricant within the bearing assembly is eliminated and the use of a single lip seal sealing structure at the distal end of the replacement bearing assembly retains the axle lubricant within the housing assembly while permitting the axle lubricant to penetrate into the proximal end of the bearing assembly to lubricate the replaceable bearing assembly, Additionally, by utilizing a single sealing portion in conjunction with the replaceable bearing assembly, the extended contact between the rotating shaft 12 and the lip seal portion 34 substantially reduces the wear between the rotating shaft and the replaceable bearing assembly. Thus, improved and longer lasting sealing is obtained between the novel replaceable bearing assembly and the rotating shaft.

I claim:

1. A bearing assembly for supporting a rotating axle shaft within an axle housing containing axle lubricant, the rotating axle shaft including an annular worn portion and an annular unworn portion, the bearing assembly comprising:

an annular sleeve means adapted to be housed in sealing engagement within the axle housing and surrounding the rotating axle shaft, the annular sleeve means having opposite ends and including an annular inner surface spaced from the rotating axle shaft, and the annular sleeve means being open at one end to the axle housing to allow lubricant to flow into the interior of the annular sleeve means from the housing to lubricate the bearing assembly, a plurality of bearing elements housed within the annular sleeve means intermediate its opposite ends and adapted to engage the unworn portion of the axle shaft, and a seal fitted to the annular inner surface of the annular sleeve means and engageable with the rotating shaft to retain the axle lubricant within the bearing assembly and axle housing, the seal being positioned between the bearing elements and the other end of the annular sleeve means.

2. A replacement bearing assembly for supporting within a housing a rotatable shaft including an annular worn portion and an annular unworn portion, the housing including a hollow interior containing lubricant and a bore which communicates with the hollow interior and through which the shaft extends, the bearing assembly comprising:

a tubular sleeve member adapted to be housed in the bore in the housing and surrounding the rotatable shaft, the sleeve member including a distal end portion and a proximal end portion, the proximal end portion of the sleeve member being open to allow lubricant to flow into the interior of the sleeve member from the interior of the housing to lubricate the bearing assembly, a bearing portion for engaging the unworn portion of the shaft, the bearing portion being housed within the sleeve member between the proximal and distal end portions thereof, and a seal portion at least partially housed within the sleeve member, the seal portion being positioned between the bearing portion and the distal end portion of the sleeve member, and the seal portion being engageable with the shaft to seal lubricant within the bearing assembly.

3. A replacement bearing assembly as set forth in claim 2 wherein the bearing portion includes a plurality of bearing elements adapted to engage the unworn portion of the shaft when the bearing assembly is operatively positioned on the shaft.

* * * * *